United States Patent Office 3,277,124
Patented Oct. 4, 1966

3,277,124
3-(LOWER ALKOXY)-17α-(LOWER ALKANOYL)
OXYPREGNA-3,5-DIENE-7,20-DIONES
Charles W. Marshall, Skokie, Ill., assignor to G. D. Searle & Co., Chicago, Ill., a corporation of Delaware
No Drawing. Filed Aug. 24, 1964, Ser. No. 391,739
2 Claims. (Cl. 260—397.4)

The present invention relates to novel steroidal 3-alkoxy-7-keto compounds and, more particularly, to 3-lower alkoxy-17α-(lower alkanoyl)oxypregna-3,5 - diene-7,20-diones which can be represented by the following structural formula

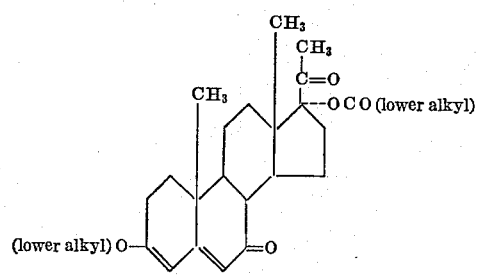

The lower alkyl radicals indicated in that representation are exemplified by methyl, ethyl, propyl, butyl, pentyl, hexyl, and the branched-chain radicals isomeric therewith.

Starting materials suitable for the manufacture of the instant compounds are 17α-(lower alkanoyl)oxypregn-4-ene-3,20-diones of the structural formula

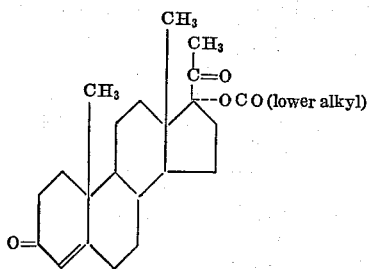

Reaction with a lower alkanol or glycol in the presence of an acid catalyst affords the corresponding Δ5-3-ketals. As a specific example, 17α-acetoxypregn-4-ene-3,20-dione is heated with ethylene glycol in the presence of p-toluenesulfonic acid to produce 17α-acetoxypregn-5-en-20-one 3-ethylene ketal. Oxidation of the latter substances with a tertiary-(lower alkyl) ester of chromic acid in an inert non-polar organic solvent such as chloroform, benzene, or pentane, in the presence of a lower alkanoic acid together with a compatible dehydrating agent results in conversion of the 7-methylene to a 7-keto group. The latter 17α-acetoxypregn-5-en-20-one 3-ethylene ketal in carbon tetrachloride is thus contacted with tertiary-butyl chromate in the presence of acetic acid and acetic anhydride to afford 17α-acetoxypregn-5-ene-3,7,20-trione 3 - ethylene ketal. Cleavage of the ketal function is readily accomplished by reaction with an aqueous acid. Heating of the latter ketal with aqueous acetic acid, for examples, results in 17α-acetoxy-3-hydroxypregna-3,5 - diene - 7,20 - dione. These enolic intermediates can be converted to the instant 3-(lower alkoxy) derivatives by a variety of methods. Reaction with the appropriate diazo(lower alkane), e.g., diazo-methane, in ether solution, is a suitable procedure. Another method involves reaction with the lower alkanol in the presence of a strong acid catalyst. Illustrative of the latter process is the reaction of the aforementioned 17α-acetoxy-3-hydroxypregna-3,5-diene - 7,20 - dione with methanol at room temperature in the presence of dilute sulfuric acid to afford 17α-acetoxy-3-methoxypregna-3,5-diene-7,20-dione.

An alternate route to the compounds of the present invention utilize as starting materials compounds of the structural formula

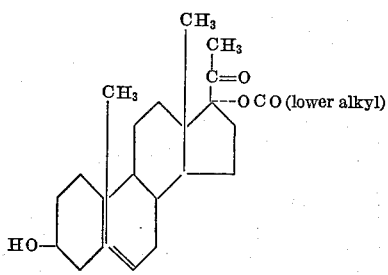

The 3-hydroxy group is first protected by acylation, and the resulting esterified product is oxidized by means of the tertiary-(lower alkyl) chromate reagent described hereinbefore or by an alkali metal chromate in acetic acid-acetic anhydride. Removal of the 3-ester function, followed by Oppenauer oxidation, i.e., reaction with an aluminum alkoxide and an aliphatic ketone, results in the 3-hydroxy-Δ3,5-intermediates referred to above. Illustrative of those processes are the reactions of 17α-acetoxy-3β-hydroxypregn-5-en-20-one with ethyl chloroformate to produce 17α-acetoxy-3β-ethoxycarbonyloxypregn - 5 - en-20-one, oxidation of the latter ester with potassium chromate in the presence of acetic acid and acetic anhydride, resulting in 17α-acetoxy-3β - ethoxycarbonyloxypregn - 5-ene-7,20-dione, and saponification of the ester group by room temperature reaction with potassium hydroxide in methanol containing dioxane, thus producing 17α-acetoxy-3β-hydroxypregn-5-ene-7,20-dione, and finally oxidation with aluminum isopropoxide and cyclohexanone in toluene solution to yield the aforementioned intermediate, i.e., 17α-acetoxy-3-hydroxypregna-3,5-diene-7,20-dione.

The compounds of the present invention display valuable pharmacological properties. They are hormonal and anti-hormonal agents, possessing, for example, progestational properties as evidenced by their ability to induce proliferation of the uterine endometrium.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight except where otherwise noted.

*Example 1*

To a solution of 24 parts of 17α-acetoxypregn-4-ene-3,20-dione in 765 parts of dry benzene is added 210 parts of ethylene glycol and one part of p-toluenesulfonic acid monohydrate. The reaction mixture is heated at the reflux temperature with vigorous stirring for about 2½ hours, during which time the water formed is separated by means of a water trap. Slow distillation with continued stirring is carried out for about 4½ hours longer, during which time additional water and a portion of the benzene is removed. During the latter heating period, fresh benzene is gradually added in order to keep the volume constant. Cooling of that mixture to room temperature followed by dilution with water and extraction with ethyl acetate affords an organic solution which is washed successively with 5% aqueous sodium bicarbonate, water, and saturated aqueous sodium chloride. Drying over anhydrous sodium sulfate followed by stripping of the solvent by distillation under reduced pressure affords a solid residue which is recrystallized twice from methanol to afford 17α-acetoxypregn-5-ene-3,20-dione 3-ethylene ketal methanolate, melting at about 239–241°. Heating under reduced pressure at about 140° for about 3 hours affords the desolvated material, which exhibits infrared absorption maxima at about 5.78, 5.83, 8.00, 9.02, and 9.28 microns.

A solution of 10 parts of 17α-acetoxypregn-5-ene-3,20-dione 3-ethylene ketal methanolate in 1100 parts of carbon tetrachloride is distilled until approximately 500 parts of distillate is collected. To the residual organic solution is added successively, at 50–55°, 50 parts of glacial acetic acid, 13 parts of acetic anhydride, and, dropwise over a period of about 20 minutes, a mixture containing 50 parts of glacial acetic acid, 12 parts of acetic anhydride, and 200 parts of a tertiary-butyl chromate in carbon tetrachloride solution equivalent to 13 parts of chromium trioxide. Heating at 50–55° is continued for about 18 hours, after which time the mixture is cooled to approximately 15° and diluted, by dropwise addition over a period of about 30 minutes, with 500 parts of 10% aqueous oxalic acid dihydrate. Stirring is continued for about one hour longer, after which time the layers are separated and the aqueous layer is extracted with carbon tetrachloride. The organic solutions are combined and washed successively with 5% aqueous sodium carbonate, water, and saturated aqueous sodium chloride. Drying over anhydrous sodium sulfate followed by removal of the solvent by distillation under reduced pressure, in a nitrogen atmosphere, affords a white solid residue which is purified by successive recrystallizations from ethyl acetate, thus affording pure 17α-acetoxypregn-5-ene-3,7,20-trione 3-ethylene ketal, melting at about 242–243°. It is further characterized by an ultraviolet absorption maximum at about 240 millimicrons with a molecular extinction coefficient of about 12,890.

To 500 parts of glacial acetic acid, under nitrogen, is added 14 parts of 17α-acetoxypregn-5-ene-3,7,20-trione 3-ethylene ketal, and the resulting mixture is heated at about 100° with stirring until solution is complete. At that time, approximately 120 parts of hot water is added rapidly, and heating with agitation is continued for about 25 minutes longer, whereupon the mixture is cooled quickly to about 5° and diluted with approximately 1200 parts of cold 5% aqueous sodium chloride. The resulting precipitated solid is extracted into methylene chloride, and the organic solution is separated, washed with 5% aqueous sodium chloride, dried over anhydrous sodium sulfate and concentrated to dryness by distillation at reduced pressure in a nitrogen atmosphere. The resulting yellow residual solid is purified by two recrystallizations from methyl alcohol to afford 17α-acetoxy-3-hydroxypregna-3,5-diene-7,20-dione as a white crystalline solid, melting at about 225–227.5°. It is characterized further by an ultraviolet absorption maximum at about 317–318 millimicrons with a molecular extinction coefficient of about 22,910. It displays also infrared absorption maxima at about 2.93, 5.77, 5.89, 6.07, 6.20, and 6.30 microns.

*Example 2*

To a solution of 50 parts of 17α-acetoxy-3β-hydroxypregn-5-en-20-one in 320 parts of dry pyridine is added, at about 10°, 43.4 parts of ethyl chloroformate over a period of about 30 minutes, with stirring. During this addition, the temperature is maintained at 10–20°. Stirring is continued at room temperature for about 3 hours, following which time the mixture is allowed to stand at room temperature for about 16 hours. The excess reagent is destroyed by the dropwise addition of approximately 20 parts of ethanol, and the resulting mixture is poured carefully into approximately 2000 parts of cold water. The precipitated solids are extracted into methylene chloride, and the extracts are combined and washed successively with 5% aqueous sodium carbonate, water and saturated aqueous sodium chloride, then dried over anhydrous sodium sulfate and distilled to dryness under reduced pressure. The last traces of pyridine are removed from the residue by codistillation with toluene. Successive crystallizations of the resulting residue from methanol afford pure 17α-acetoxy-3β-ethoxycarbonyloxypregn-5-en-20-one, melting at about 200–205°.

A solution of 46 parts of 17α-acetoxy-3β-ethoxycarbonyloxypregn-5-en-20-one in 440 parts of benzene is distilled almost to dryness, and the resulting residue is dissolved, at about 55°, in a mixture of 1260 parts of glacial acetic acid containing 350 parts of acetic anhydride. The resulting solution is cooled to about 35–40°, and 50 parts of solid potassium chromate is added portionwise over a period of about 15 minutes. Stirring at that temperature is continued for about 48 hours, following which time the solution is concentrated to approximately ½ volume, then is poured carefully into a mixture of approximately 6000 parts of ice and water. The resulting aqueous mixture is extracted with ethyl acetate, and the extracts are combined, washed successively with dilute hydrochloric acid, water, 5% aqueous sodium carbonate, water, and saturated aqueous sodium chloride. Drying over anhydrous sodium sulfate followed by removal of the solvent by distillation under reduced pressure affords a residue which is purified by successive recrystallization from methanol to afford pure 17α-acetoxy-3β-ethoxycarbonyloxypregn-5-ene-7,20-dione, melting at about 225–230°. It exhibits an ultraviolet absorption maximum at about 235 millimicrons with a molecular extinction coefficient of about 12,800.

To a solution of 16 parts of 17α-acetoxy-3β-ethoxycarbonyloxypregn-5-ene-7,20-dione in 720 parts of methanol containing 100 parts of dioxane, in an atmosphere of nitrogen, is added a nitrogen-saturated solution containing 4.5 parts of potassium hydroxide in 80 parts of methanol. The resulting reaction mixture is stirred at room temperature for about 10 minutes, is then diluted with approximately 7 parts of water, then is stirred for an additional 5 minutes. Neutralization of the mixture by the addition of approximately 140 parts by volume of 10% aqueous acetic acid followed by concentration of the solution to a small volume affords a residual mixture, which is poured into approximately 3000 parts of 5% aqueous sodium chloride. The resulting white precipitate is collected by filtration and washed on the filter with water to afford crude 17α-acetoxy-3β-hydroxypregn-5-ene-7,20-dione. Crystallization from methanol followed by recrystallization from benzene-pentane affords the pure material, melting at about 260–266°. It is characterized further by an optical rotation, in chloroform, of −160° and an ultraviolet absorption maximum at about 237 millimicrons with a molecular extinction coefficient of about 12,700.

A solution of 8.5 parts of 17α-acetoxy-3β-hydroxypregn-5-ene-7,20-dione in 480 parts of dry toluene is distilled until anhydrous, at which time 81 parts of cyclohexanone followed by 150 parts by volume of a toluene solution containing 10.7 parts of aluminum isopropoxide are added. The latter solution is added over a period of about 5 minutes, and the mixture which results is heated at the reflux temperature for approximately 30 minutes, then is cooled immediately to 0–5°. Extraction of the cold mixture with ethyl acetate affords an organic solution, which is washed successively with cold 2% aqueous sulfuric acid and 5% aqueous sodium chloride. The ethyl acetate solution is then extracted with 2% aqueous sodium hydroxide, and the alkaline extracts are immediately neutralized by pouring into approximately 900 parts by volume of an aqueous solution, 5% in hydrogen chloride and 5% in sodium chloride. The precipitate which forms is collected by filtration, then is washed on the filter with cold aqueous 5% sodium chloride and slurried with approximately 500 parts of cold water, then is filtered and dried. The resulting crude 17α-acetoxy-3-hydroxypregna-3,5-diene-7,20-dione melts at about 233–239°. Purification by recrystallization from methanol affords the pure substance, melting at about 243–244.5° and identical with the ultimate product of Example 1.

*Example 3*

To a solution of one part of 17α-acetoxy-3-hydroxypregna-3,5-diene-7,20-dione in 80 parts of methanol is added 0.7 part by volume of 2.8 N sulfuric acid. The resulting reaction mixture is allowed to stand at room temperature for about 24 hours, then is poured carefully into approximately 1000 parts by volume of cold aqueous 5% sodium chloride. The resulting mixture is extracted with ethyl acetate, and the organic extract is separated, then washed with cold aqueous 2% sodium hydroxide in order to remove any unreacted enol. The organic layer is washed successively with 5% aqueous sodium bicarbonate, 5% aqueous sodium chloride and saturated aqueous sodium chloride. Drying over anhydrous sodium sulfate followed by removal of the solvent by means of distillation under reduced pressure affords the crude product. Purification by crystallization from methanol yields needle-like crystals of 17α-acetoxy-3-methoxypregna-3,5-diene-7,20-dione, melting at about 266–269°. This compound is characterized further by the following structural formula.

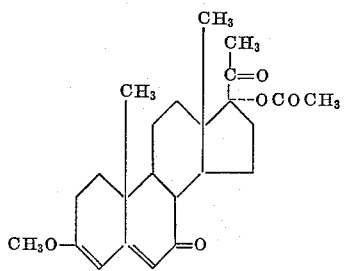

*Example 4*

The substitution of an equivalent quantity of 17α-propionoxypregn-4-ene-3,20-dione in the procedure of Example 1 or of 3β-hydroxy-17α-propionoxypregn-5-en-20-one in the procedures of Example 2 results in 3-hydroxy-17α-propionoxypregna-3,5-diene-7,20-dione.

*Example 5*

By substituting equivalent quantities of 3-hydroxy-17α-propionoxypregna-3,5-diene-7,20-dione and ethanol in the procedure of Example 3, there is obtained 3-ethoxy-17α-propionoxypregna-3,5-diene-7,20-dione of the structural formula.

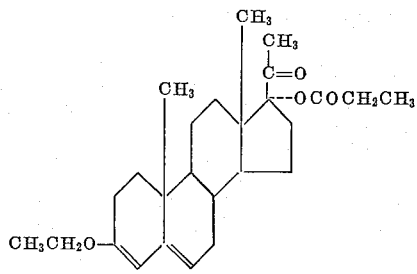

What is claimed is:
1. A compound of the formula

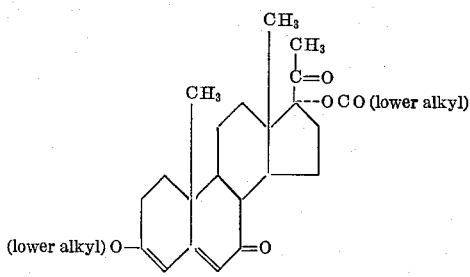

2. 17α - acetoxy - 3 - methoxypregna - 3,5 - diene-7,20-dione.

References Cited by the Examiner
UNITED STATES PATENTS
2,934,545   4/1960   Marshall _____ 260—397.4

References Cited by the Applicant
Yasuda, Chem. Pharm. Bull., 11, 1167 (September 1963).

LEWIS GOTTS, *Primary Examiner.*

ELBERT ROBERTS, *Assistant Examiner.*